Patented Mar. 14, 1950

2,500,765

UNITED STATES PATENT OFFICE 2,500,765

MIXED FATTY ACID AND ROSIN ESTERS OF RESINOUS EPOXIDES

Latané G. Montague, Louisville, Ky., assignor to Devoe & Raynolds Company, Inc., Louisville, Ky., a corporation of New York No Drawing. Application March 13, 1947,
Serial No. 734,564

9 Claims. (Cl. 260—18)

This invention has to do with synthetic compositions and, more particularly, has to do with new and novel ester compositions.

As is well known to those familiar with the art, numerous ester compositions have been developed to date. Many of these ester compositions have been developed for use in varnish formulations, wherein the following properties are desired: resistance to acids, alkalies, water and other chemicals; durability, hardness and flexibility; rapid drying action; "body"; light color; gloss; adhesion to surfaces; solvent tolerance; package stability; etc. Of the ester compositions hitherto prepared, none has imparted to varnish formulations all of the desirable properties recited here. For example, several have been characterized by rapid drying action, but have had poor solvent tolerance and little package stability; others have been resistant to water, but not to the action of acids or alkalies. Accordingly, considerable investigation has continued in the search for an ester composition having all of the foregoing desired properties.

It has now been found that such an ester composition can be synthesized from certain high molecular weight resinous epoxides containing hydroxyl groups, rosin and/or abietic acid, and a relatively long-chain unsaturated fatty acid. The ester compositions contemplated herein are prepared from the aforesaid materials in well-defined proportions as discussed hereinbelow.

The resinous epoxides utilized for the ester compositions of this invention are characterized by softening points (Durrans mercury method) of from about 90° C. to about 110° C., and are prepared by reacting an epihalohydrin with a bisphenol, the latter being in the form of its corresponding metal salt, such as an alkali metal salt. Preferred epoxides so characterized are prepared, for example, by reacting from about 1.15 to about 1.4 molar proportions of epichlorhydrin with about 1 molar proportion of bisphenol and with about 1.15 to about 1.8 molar proportions of alkali. As indicated, the quantity of alkali used is equivalent to, or in excess of, the chlorine in the epichlorhydrin. Preferred epoxides are those prepared from bisphenol, epichlorhydrin and sodium hydroxide in the proportions of 1:1.25:1.5 with the epoxides having softening points from about 95° C. to about 105° C. Particularly preferred is an epoxide composition having a softening point of approximately 100° C.

While epichlorohydrin is the preferred epihalohydrin for the preparation of the epoxides contemplated herein, homologs thereof may be used advantageously. For example, epibromhydrin may be used.

Bisphenol used in preparing the ester compositions may be formed by condensing phenol with acetone, and is a mixture of isomers of dihydroxy-diphenyl-dimethyl methane, with the 4,4' isomers predominating and with lesser quantities of the 2,2'- and 4,2' isomers being present. This material is generally identified commercially as "Bis Phenol A." It should be understood, however, that any one, or any combination, of the said isomers present therein may be used.

In the preparation of the resinous polymeric epoxides, aqueous alkali is used, thereby combining with the halogen of the epihalohydrin reactant. As indicated above, the quantity of alkali is substantially equivalent to the quantity of said halogen, or is somewhat in excess thereof. Aqueous sodium hydroxide is an inexpensive and available alkali for the preparation. Other strong aqueous alkalies may also be used; for example, potassium hydroxide and lithium hydroxide.

To prepare the desired epoxides, the aqueous alkali, bisphenol and epichlorhydrin are advantageously added together at the outset. In such a procedure, the aqueous alkali serves to dissolve the bisphenol, with the formation of the corresponding monophenoxide and diphenoxide alkali salts. Alternatively, the alkali and bisphenol may be admixed, and the epichlorhydrin added thereto; or an aqueous solution of alkali and bisphenol may be added to the epichlorhydrin. Reaction takes place with the evolution of heat, which serves to further the reaction. The rise in temperature of the reactants may be controlled by regulating the amount of water used in the form of aqueous alkali. Also, the temperature may be controlled by circulating a suitable heat transfer medium about the exterior walls of the vessel or apparatus in which the reaction takes place. Such means are well known in the art. Heat is applied to complete the reaction, the temperature generally being maintained at about 80–110° C. for a sufficient length of time. Depending upon the quantities of reactants used, the time required for complete reaction varies from about 30 minutes to 3 hours or more. The reaction conditions are illustrated by the typical examples set forth hereinafter.

As the reaction proceeds, the reaction mixture separates into an upper aqueous layer which is drawn off and the residue, generally of taffy-like consistency, settles to the bottom of the reaction vessel. The residue is then washed with hot water, continuously or intermittently, for a short period of time. The residue and hot water are agitated thoroughly. The wash water is drawn off. The washing procedure may be repeated several times, as necessary, to effect removal of any unreacted alkali and the by-product sodium chloride, for example. Dilute acids, such as acetic or hydrochloric, may be used to neutralize excess alkali during the washing procedure. It is usually desirable to wash the product entirely free from alkali and salt, inasmuch as unreacted alkali or basic salts such as sodium acetate, may induce further polymerization during the drying process, when heat is applied to remove the final traces of water. The wet product or resin may be dried by heating and stirring until the temperature rises substantially above the boiling point of water, or by other suitable means.

While certain organic solvents may be used instead of water in the preparation of the resinous epoxides, the use of water is preferred. When organic solvents in which the reaction product is soluble, are used, the reaction product can be freed from salts in some cases by filtration and the product then recovered by distillation of the solvent. In the case of products which are soluble or partially soluble in hot water, in which the by-product salt is also soluble, an organic solvent may be used advantageously; in such case, the product can be freed from by-product salt by filtration. When an organic solvent is used it should be one which does not react with the reactants or reaction product.

As indicated hereinabove, rosin is one of the acid materials used with the aforesaid resinous epoxides to form the ester compositions of this invention. It is well to know that the predominant constituent of rosin is abietic acid; the latter readily enters into reaction with said epoxides. Various rosin compositions available commercially are well suited for use in preparing the ester compositions. The acid values of the rosin, preferably vary from about 150 to about 170. Particularly preferred rosin compositions, however, are those having acid values of about 160. A preferred rosin is one long known in the trade as W. G. rosin. It should be understood that abietic acid and sources, other than rosin, containing said acid may also be used.

In addition to the rosin esterifying acid, one or more relatively long-chain unsaturated fatty acids are used. The fatty acids which have proven unusually satisfactory are those present in drying and semi-drying oils. Oleic, linoleic, licanic, linolenic, clupanodonic, eleostearic, etc., are typical of acids present in such oils. It will be clear that the acids generally have about 18 carbon atoms and one or more olefin groups. Linseed oil fatty acids, which are mixtures of oleic, linoleic and linolenic acids, represent a preferred source for the esterification. Soy bean oil fatty acids, castor fatty acids, and China-wood oil fatty acids represent other preferred sources. Fatty acids which are advantageously used in combination with linseed oil fatty acids and/or soy bean oil fatty acids, are those obtained from cotton seed oil and identified as cottonseed oil fatty acids. The latter are generally mixtures of oleic and linoleic acids, with relatively small quantities of stearic acid. Other fatty acids which may be used include enriched oils, such as those obtained by solvent extraction of vegetable and marine animal oils, such as linseed, soy bean, sardine, menhaden, etc.

It will be apparent to those familiar with the art that the quantities of the individual acids, such as oleic and linoleic, will vary appreciably in the various drying and semi-drying oils. These materials have varying degrees of unsaturation as indicated by their iodine values. In providing the ester compositions herein, it is preferred to use those fatty acids having average iodine values of the order of 80 to 250, with particular preference for those of the order of 130–160. Further, it is to be understood from the foregoing that use can be made of naturally occurring sources of fatty acids and of blends of the same.

It has been found that the proportions of rosin and fatty acids fall within certain well-defined proportions in the formation of the unusual ester compositions contemplated herein. In esterifying the aforesaid resinous epoxides, it has been found that from about 1 to about 2 parts of rosin should be used, with from about 3 to about 5 parts of fatty acid or mixture of fatty acids, and with from about 3.5 to about 5 parts of resinous epoxide. A satisfactory resinous composition can be prepared from 1 part of rosin, about 5 parts of linseed oil acids and about 4.6 parts of the resinous epoxide. All parts are by weight in the esterification procedure. If only rosin or the fatty acid were used alone with the resinous epoxide, or if rosin and the fatty acid were used together in proportions other than those specified here, the ester composition would not possess all of the desired qualities recited at the outset. For example, if rosin were used in greater proportion, the ester would not provide a varnish composition of desired mineral spirits, tolerance or solubility, and would have excessive "body" and acid value. Similarly, if the fatty acid were used in greater proportion, the ester would provide a varnish with insufficient hardness.

Esterification is a well known reaction and has been used extensively in preparing varnish compositions. Esterification procedures commonly used in varnish making practice may be used advantageously for preparing the ester compositions of this invention. For example, the resinous epoxide may be esterified with rosin and fatty acids, in the proportions specified above, by agitating and heating the same at temperatures of the order of 200–300° C., with temperatures of 235–275° C. preferred. Water formed during the esterification may be removed effectively from the reaction mixture by bubbling a slow stream of inert gas, such as nitrogen, through the reaction mixture. Another modification which may be resorted to involves the use of a small amount of water-insoluble solvent, together with a suitable reflux condenser for removing the water, the condenser being suitably attached to the esterification reaction vessel.

The preparation of the resinous epoxides described above and of the new ester compositions thereof, are illustrated by the following examples. These examples serve to illustrate the invention and in no sense is the invention limited thereto. All parts mentioned in the examples are by weight.

ILLUSTRATIVE EXAMPLES

A. *Preparation of resinous epoxides*

EXAMPLE I

A typical example illustrative of the process in which approximately 3 mols of bisphenol A is reacted with 4 mols of epichlorhydrin and an amount of sodium hydroxide approximately 25% in excess of the theoretical is carried out as follows. The ingredients used were 307.5 pounds bisphenol A, 166.3 pounds epichlorohydrin, 96 pounds caustic soda, 600 pounds of water. 54 pounds of the caustic were dissolved in 600 pounds of water in an open kettle provided with a mechanical agitator. The bisphenol A was added and the mixture stirred for about 10 minutes at a temperature of about 33° C., the epichlorhydrin was added and the temperature increased to about 65° C. from the exothermic heat of reaction. A solution of 18 pounds of caustic soda dissolved in 4 gallons of water was then added with continued stirring, with a rise in temperature to around 79° C. Heat was applied to raise the temperature to about 85° C. and a solution of 24 pounds of caustic soda dissolved in 5 gallons of water was added and heating continued while maintaining a temperature around 90 to 100° C. for a period of about 1 hour. External heating was discontinued, 5 gallons of cold water added to check boiling of the water, and the upper aqueous layer was then drawn off.

The product was washed with 50—60 gallons of boiling water for a period of 20 minutes, then with a similar amount of boiling water containing acetic acid to neutralize unreacted caustic soda, and then 4 times in succession with a similar amount of boiling water. After as much as possible of the water had been removed, external heat was applied with continued stirring to dry the product, the temperature rising to 150° C. The liquid product was drawn off and allowed to solidify, and had a softening point of 95° C. (Durrans mercury method).

EXAMPLE II 4 mols of bisphenol A and 5 mols of epichlorhydrin were reacted with the addition of caustic soda solution (6.43 mols), the reaction temperature going from 40 to 100° C. in 80 minutes, and being kept at 100-104° for 60 minutes. The resulting resin after washing and drying had a softening point of 100° C., an average molecular weight of 1133, an equivalent weight to epoxide of 860, corresponding to about 1.3 epoxide groups per molecule, and an equivalent weight to esterification of 200.

The epoxide group content of the resinous epoxide composition was determined for practical purposes by determining the equivalent weight of the composition per epoxide group. The method used involved heating one gram sample of the epoxide composition with an excess of pyridine containing pyridine hydrochloride (made by adding 16 cc. of concentrated hydrochloric acid per liter of pyridine) at the boiling point for 20 minutes and back titrating the excess pyridine hydrochloride with 0.1 N sodium hydroxide, using phenolphthalein as indicator, and considering that one HCl is equivalent to one epoxide group.

The equivalent weight to esterification was determined by heating the epoxide composition with about twice the theoretical amount of linseed oil fatty acids necessary to react with all of the epoxy and hydroxyl groups, at 228° C. until a constant acid value was obtained. By back titrating the unreacted linseed acids, the esterifiable hydroxyl content was calculated from the acid values. In view of the possibility or probability that some polymerization takes place during this high temperature esterification the results can only be considered a rough indication of the total epoxy plus hydroxyl groups esterified.

EXAMPLE III

In a vessel provided with a mechanical agitator and a condenser of the Bidwell-Sterling type were placed 45.99 parts of the epoxide of Example II, 8.44 parts of W. G. rosin, and 48.61 parts of linseed oil acids. A sufficient amount of mineral spirits (boiling range 160-200° C. was added to provide refluxing at 250° C. This mixture was heated at 250°-260° C., with continuous agitation, for about 8 hours to provide an ester composition having an acid value of 7.

A 40% solution of this product in mineral spirits has a viscosity of E-F (Gardner-Holdt scale). After the addition of a small amount of driers this varnish was sufficiently fast drying so that two coats of varnish could be applied within about 4 hours. The converted varnish films, either air dried or baked, are extremely resistant to water, alkali and other chemicals.

EXAMPLE IV

In the manner outlined in Example III above, 43.4 parts of a resinous epoxide composition (softening point of about 100° C., prepared as indicated in Example II above), 19.1 parts of W. G. rosin, 18.1 parts of linseed oil fatty acids and 22.1 parts of cottonseed oil fatty acid fraction (iodine value 100; acid value 195) were reacted together. Mineral spirits, (boiling range 160-200° C.) was added to provide refluxing at 250° C. The reaction mixture was heated for about 11 hours at about 250° C., with continuous agitation. The ester composition thus formed has an acid value of about 9.

A 40% solution of the ester composition in mineral spirits has a viscosity of F (G-H scale). With small amounts of typical driers, namely 0.2% lead naphthenate and 0.04% cobalt naphthenate, incorporated with the varnish solution, it was possible to apply two coats of varnish within about 4 hours. The converted films have outstanding resistance to water, alkali and other chemicals.

EXAMPLE V

Following the procedure described in Example III above 43.4 parts of a resinous epoxide composition (softening point of about 100° C., and prepared as indicated in Example II above), 19.0 parts of W. G. rosin, 10.0 parts of linseed oil fatty acids and 30.2 parts of a cottonseed oil fatty acid fraction (iodine value, 130, acid value, 190), were reacted together. Mineral spirits (160-200° C.) was added thereto in sufficient quantity to provide refluxing at 265° C. The resulting mixture was heated at about 280° C. for about 8 hours, with continuous agitation. The ester composition formed has an acid value of 8.5.

The viscosity (G-H scale) of a 40% solution of this product in mineral spirits is E.

As indicated hereinabove, the ester compositions contemplated herein are outstanding, particularly as varnish coatings. Illustrative of their superior quality is their characteristic rapid drying action. For example, when a film of an ester composition such as described in Examples III—V above, is applied over a sealed wood surface, the film is substantially dry after 4 hours. With typical varnish compositions presently marketed by representative varnish manufacturers, varnish films of the same relative thickness applied in the same manner are substantially dry only after 12-20 hours. Furthermore, a film of the type represented by Examples III—V is ready for a second coat after about 4 hours, as against 12-20 hours for the aforesaid varnish products.

Another outstanding quality of the ester compositions contemplated herein is initial and ultimate toughness. These compositions have a high degree of mar resistance when originally applied to wood, glass, metal surfaces, etc. Illustrative of their ultimate toughness is the demonstration that a film, 0.0015" in depth, on a glass panel will "ribbon" off with a knife blade at a high rate of shear, after two weeks normal air-drying. In other words, the film so removed from the glass is in the form of a continuous filament or ribbon. This condition prevails even after a year of normal exposure of the film to atmospheric conditions. In direct contrast to this demonstration are strictly comparable tests with the aforesaid slow-drying varnish compositions. The latter materials are brittle, and fracture or shatter off the glass surface after a two weeks period of normal air-dry; that is, the films are ruptured from the glass surface in short, broken strands. Further, when films of ester compositions such as those of Examples III–V are applied to a wood surface and the latter is thereafter struck a sharp breaking blow with a hammer the wood cells fracture, but the film does not break. With films of the aforesaid slow-dry varnish compositions, subjected to a similar force, the films rupture as well as the wood cells. In further contrast, the ester compositions of this invention remain tough and resist embrittlement with age.

Other striking demonstrations of the unusual character of the ester compositions of this invention are great adhesion to metal surfaces and great elasticity. These qualities are shown by subjecting a film applied to a steel surface, to a well-known impact test, namely the Parlin-du Pont impact test (Physical and Chemical Examination of Paints, Varnishes, Lacquers and Colors; Gardner et al.; 10th edition, 1946; p. 173). This test involves bringing a polished, hard steel ball, with a considerable force, against the metal surface carrying the coating. With a film of ester compositions such as those of Examples III–V, subjected to this test, with the ball directly striking the film, the metal surface shears but the film remains intact and unbroken. This illustrated the great adhesion of the films. When the ball is forced against the uncoated side of the metal test panel, the film on the coated side does not fracture, although the metal does. This demonstrated the high degree of elasticity of the film. Again in direct contrast, films of the aforesaid slow-dry varnish compositions will fracture when subjected to this test; the film fractures when the ball is directly applied to the coated metal surface and when the ball is applied to the uncoated side of the metal panel.

Still another outstanding characteristic of the ester compositions contemplated herein is great alkali resistance. A film applied to a glass surface, after one week, withstands immersion for 6 hours in a 5% aqueous caustic solution maintained at 77° F. Opposed to this are strictly comparable tests with the aforesaid slow-dry varnish compositions presently being marketed; the latter fail after only several minutes' immersion in the caustic solution.

The ester compositions of this invention are readily soluble in hydrocarbon solvents. Solutions of the esters are advantageously used as varnishes, such as spray varnishes, brushing varnishes, oil type products, etc. The balanced nature of the esters enables them to be used simply by dissolving the esters in appropriate solvents. Pigmented products may be produced by incorporating pigments with the ester and solvent. In making pigmented products, the vehicle portion of the finished product may be made up entirely of the ester compositions dissolved in the solvent. Pigments which may be so used include $TiO_2$, particularly rutile type; associations of $TiO_2$ and other pigments such as barium sulfate, calcium sulfate, zinc oxide, etc.; iron oxide; chrome yellow; and the like. Blends of the esters with other resinous materials, such as certain alkyds, resin gums or oleoresinous varnishes, etc., may be made.

Coating compositions made with the esters may be used for many purposes where varnishes, varnish enamels and pigmented products are desired, such as floor and deck enamels, enamels for coating metals, cement, plastered walls where alkali is present, water tanks, or other surfaces which may be exposed to acids, alkalies, or moisture. As indicated above, the coating compositions are converted into insoluble and infusible surface coatings by air oxidation or heat polymerization after removal of the volatile solvent.

In the illustrative examples presented above, small amounts of driers were incorporated into the varnish compositions. Typical driers which may be used to advantage are calcium, zinc, manganese, cobalt, and lead naphthenates. It is preferred that the drier or driers be used in relatively small concentrations; for example, from a trace to about one percent may be used.

It is to be understood that the illustrations provided hereinabove serve to typify the invention and are not to be considered as limitations thereof; rather, the invention is to be broadly construed in the light of the language of the appended claims.

I claim:

1. Resinous compositions which are mixed long-chain unsaturated vegetable oil fatty acid and rosin esters of high molecular weight resinous epoxides containing hydroxyl groups, which resinous expoxides have a softening point between about 90° C. and about 110° C. and are prepared by reacting a mixture of 1 molar proportion of dihydroxy-diphenyl-dimethyl methane with about 1.15 to 1.4 molar proportions of epichlorhydrin and about 1.15 to 1.8 molar proportions of caustic alkali, said mixture being heated during the final stage of reaction; said mixed esters being formed by heating from about 3.5 parts to about 5 parts of said resinous epoxide with from about 1 to 2 parts of rosin and from about 3 to about 5 parts of said fatty acids and with the total parts so reacted being about 10, said ester compositions being readily soluble in hydrocarbon solvents to form varnish compositions.

2. Ester compositions as defined in claim 1 in which the long-chain unsaturated fatty acids are drying oil acids.

3. Ester compositions as defined in claim 1 in which the long-chain unsaturated fatty acids are linseed oil acids.

4. Ester compositions as defined in claim 1 in which the long-chain unsaturated fatty acids are a mixture of linseed oil acids and cottonseed oil acids.

5. Ester compositions as defined in claim 1 in which the polymeric polyhydric alcohol is characterized by a softening point of about 100° C.

6. Ester compositions as defined in claim 1 in which the polymeric polyhydric alcohol is characterized by a softening point of about 95° C.

7. Resinous compositions which are mixed linseed oil fatty acid and rosin acid esters of a high molecular weight resinous epoxide containing hydroxyl groups, which resinous epoxides have a softening point of about 100° C. and are prepared by reacting a mixture of 1 molar proportion of dihydroxy-diphenyl-dimethyl methane with about 1.25 molar proportions of epichlorhydrin and about 1.5 molar proportions of caustic alkali, said mixture being heated during the final stage of reaction; said mixed esters being formed by heating about 4.6 parts of said resinous epoxide with about 1 part of rosin and about 5 parts of linseed oil fatty acids, said ester compositions being readily soluble in hydrocarbon solvents to form varnish compositions.

8. Resinous compositions which are mixed linseed oil acid, cottonseed oil acid, and rosin acid esters of a high molecular weight resinous epoxide having a softening point of about 100° C. and prepared by reacting a mixture of 1 molar proportion of dihydroxy - diphenyl - dimethyl methane with about 1.25 molar proportions of epichlorhydrin and about 1.5 molar proportions of caustic alkali, said mixture being heated during the final stage of reaction; said mixed esters being formed by heating about 4.3 parts of said resinous polyepoxide with about 1.9 parts of rosin, about 1.8 parts of linseed oil fatty acids and about 2.2 parts of cottonseed oil fatty acids, said ester compositions being readily soluble in hydrocarbon solvents to form varnish compositions.

9. Resinous compositions which are mixed linseed oil acid, cottonseed oil acid, and rosin acid esters of a high molecular weight resinous epoxide having a softening point of about 100° C. and prepared by reacting a mixture of 1 molar proportion of dihydroxy-diphenyl-dimethyl methane with about 1.25 molar proportions of epichlorhydrin and about 1.5 molar proportions of caustic alkali, said mixture being heated during the final stage of reaction; said mixed esters being formed by heating about 4.3 parts of said resinous epoxide with about 1.9 parts of rosin, about 1.0 parts of linseed oil fatty acids and about 3 parts of cottonseed oil fatty acids having an iodine value of approximately 130, said ester composition being readily soluble in hydrocarbon solvents to form varnish compositions.

LATANÉ G. MONTAGUE.

REFERENCES CITED

The following references are of record in the file of this patent:

UNITED STATES PATENTS

| Number | Name | Date |
|---|---|---|
| 2,213,477 | Steindorff et al. | Sept. 3, 1940 |
| 2,324,483 | Castan | July 20, 1943 |